United States Patent [19]

Komuro et al.

[11] Patent Number: 4,735,278
[45] Date of Patent: Apr. 5, 1988

[54] HEATED AIR DUCTING STRUCTURE FOR MOTOR CYCLES

[75] Inventors: Katsusuke Komuro, Tokyo; Hideaki Nebu, Saitama; Shigehisa Morinaka, Saitama; Yoshiaki Kashio, Saitama, all of Japan

[73] Assignee: Honda Giken Kogyo Kabushik Kaisha, Tokyo, Japan

[21] Appl. No.: 874,340

[22] Filed: Jun. 13, 1986

[30] Foreign Application Priority Data

Jun. 14, 1985 [JP] Japan .............................. 60-89970[U]
Jun. 14, 1985 [JP] Japan .............................. 60-89966[U]
Jun. 14, 1985 [JP] Japan .............................. 60-89967[U]
Jun. 14, 1985 [JP] Japan .............................. 60-89969[U]
Jun. 14, 1985 [JP] Japan .............................. 60-89962[U]

[51] Int. Cl.$^4$ ............................................. B60K 11/04
[52] U.S. Cl. ................... 180/229; 180/219; 180/68.2; 123/41.66
[58] Field of Search ............... 180/219, 225, 229, 296, 180/68.2; 123/41.56, 41.66, 41.69, 41.7

[56] References Cited

U.S. PATENT DOCUMENTS

| | | | |
|---|---|---|---|
| 1,988,975 | 1/1935 | Weiland | 180/68.2 |
| 3,598,092 | 8/1971 | Honda | 123/41.69 |
| 4,577,720 | 3/1986 | Hamane et al. | 180/229 |
| 4,618,020 | 10/1986 | Noda et al. | 180/229 |

Primary Examiner—John J. Love
Assistant Examiner—Donn McGiehan
Attorney, Agent, or Firm—Irving M. Weiner; Joseph P. Carrier; William D. Blackman

[57] ABSTRACT

A heated air ducting structure (20; 200; 300; 360; 400) for motor cycles (50; 350; 450) including an engine (2; 302) mounted at a lower position in the front part of a vehicle body frame (1) and a a rider's seat (4; 401) installed on the vehicle body frame behind the engine. The ducting structure comprises a duct (20a; 208, 208r, 205a, 205c; 321, 314; 361, 365; 404, 405, 409) having a heated air entry (20b; 208c; 322; 362; 407) which, facing a rear portion (2b; 302g) of the engine, takes in heated air that has cooled the engine, and a heated air exit (20c; 205f; 328; 365b; 409b) which opens in the rearward direction of the vehicle.

13 Claims, 4 Drawing Sheets

HEATED AIR DUCTING STRUCTURE FOR MOTOR CYCLES

BACKGROUND OF THE INVENTION

1. Field of the Invention

The present invention generally relates to a heated air ducting structure for motor cycles. More particularly, the invention relates to a heated air ducting structure for motor cycles of the type in which a rider's seat is disposed posterior to an engine.

2. Description of Relevant Art

In general, motor cycles, excepting small-sized motor cycles of a power unit swing type, include an engine mounted at a lower position in the front part of a vehicle body frame, a fuel tank installed above the engine, a rider's seat arranged in the rear of the fuel tank, continuously to the rear part of the tank, side covers provided below the rider's seat, at the left and right, with an intention to cover auxiliary equipment such as a battery, and a rear fender disposed over a rear wheel.

Moreover, in most of those motor cycles which are relatively large in vehicle size and in displacement of the engine mounted thereon, there is provided, in addition to such vehicle components as described above, at least one rear side container to be disposed, in the rear of the side covers, at either side of the rear wheel. In this respect, most of such motor cycles of relatively large size are constituted as of a tandem seat type.

Incidentally, in such motor cycles as described, the engine as a heat generating part is cooled with air that flows from ahead of the vehicle toward the engine, cooling the engine, while the vehicle is travelling. Then, after the cooling of the engine, heated air flows in the rearward direction of the engine.

However, in such motor cycles, a narrow space defined between the engine and a bottom surface of the fuel tank is utilized to arrange, in the rear part thereof, certain auxiliary equipment to be covered by the side covers. Disadvantageously, a part of the heated air tends to stagnate in the narrow space, raising the temperature therein. Further, due to the presence of such auxiliary equipment, the heated air having cooled the engine is let to flow to the rear of the vehicle, not directly but along side surfaces of the side covers, so that a driver as an anterior rider, as well as a passenger as a posterior co-rider, is likely to be exposed at the legs to streams of the heated air. Such circumstance is notable in motor cycles of such relatively large type in size as described.

In this respect, in such conventional motor cycles as described, it is desirous, if permitted, to prevent the stagnation of heated air in the narrow space between the engine and the bottom surface of the fuel tank, thereby avoiding temperature rise in this narrow space, and concurrently to possibly minimise the quantity of heated air rearwardly flowing along the side covers provided at both sides of the vehicle.

With such points in mind, the present invention has been achieved to effectively substantiate a desideratum in such motor cycles as described, particularly of such type which is relatively large in vehicle size and in displacement of engine.

SUMMARY OF THE INVENTION

An object of the present invention is to provide a heated air ducting structure for motor cycles which is adapted to prevent heated air, as it has cooled an engine, from stagnating in a narrow space defined between the engine and a bottom surface of a fuel tank, thereby avoiding temperature rise in the narrow space, and concurrently to possibly minimise the quantity of the heated air that rearwardly flows along both sides of the vehicle.

To achieve the aforementioned object, the present invention provides a heated air ducting structure for motor cycles including a vehicle body frame, a front wheel and a rear wheel provided at the front and rear of the vehicle body frame, respectively, an engine mounted at a lower position substantially in the front part of the vehicle body frame, and a rider's seat installed on the vehicle body frame behind the engine. The heated air ducting structure comprises a duct having a heated air entry facing a rear portion of the engine, the heated air entry being adapted for taking therein heated air having cooled the engine, and a heated air exit opening in the rearward direction of the vehicle.

The above and further featues, objects and advantages of the present invention will more fully appear from the following detailed description of the preferred embodiments of the invention when the same is read in conjunction with the accompanying drawings.

DETAILED DESCRIPTION OF THE PREFERRED EMBODIMENTS

Figure 1:
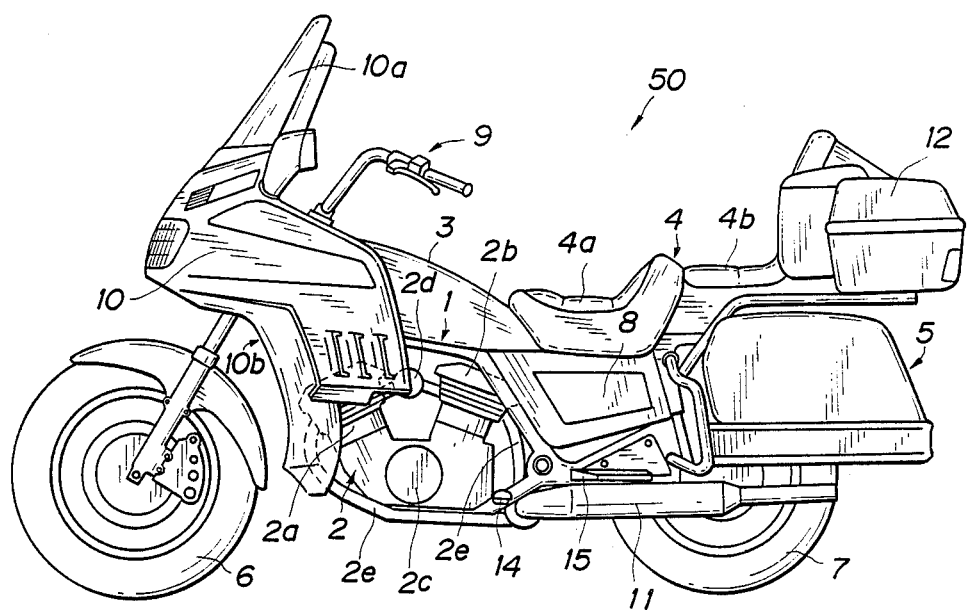
FIG. 1 is a side view of the entirety of a motor cycle equipped with a heated air ducting structure according to a first embodiment of the present invention.
Figure 2:
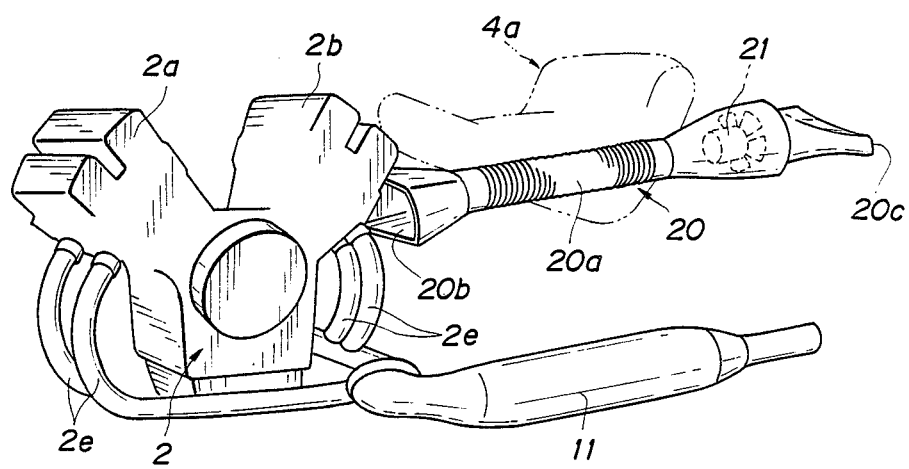
FIG. 2 is a perspective view of an essential part of the heated air ducting structure.

Referring first to FIG. 1, designated at reference numeral 50 is the entirety of a motor cycle, which is equipped with a heated air ducting structure 20, FIG. 2, according to a first embodiment of the present invention. The motor cycle 50 includes a vehicle body frame 1, and a four-cylinder engine 2 relatively large of displacement and disposed at a lower position in the front part of the vehicle body frame 1. The engine 2 is of a V form in side view and consists of a front cylinder portion 2a, a rear cylinder portion 2b, and a crankcase 2c. Exhaust pipes 2e, downwardly led out from the front cylinder portion 2a and rearwardly extended or downwardly led out from the rear cylinder portion 2b, are collected to be connected to a muffler 11. The motor cycle 50 further includes a handlebar 9 with a part steerably inserted in a head tube (not shown) fixed to the front part of the vehicle body frame 1, a front wheel 6 steerable with the handlebar 9, and a front cowl 10 having a fairing 10a that covers the front of the handlebar 9. In the front part of the front cowl 10, there is formed a front air entry 10b. Still further, the motor cycle 50 includes a fuel tank 3 disposed above the engine 2 and fixed on the front part of the vehicle body frame 1, and a rider's seat 4 of a tandem type installed on the rear part of the vehicle body frame 1 and arranged to be continuous with a rear portion of the fuel tank 3. The seat 4 consists of a front part 4a as a driver's seat and a rear part 4b as a passenger's seat. As shown in FIG. 1, the rider's seat 4 is disposed posterior to the engine 2. Also, the motor cycle 50 includes a pair of side covers 8 disposed at the lower left and right of the driver's seat 4a, the side covers 8 having an inner space defined therebetween for accommodating therein auxiliary equipment such as a battery (not shown), a box-like rear bag 12 installed at the rear of the passenger's seat 4b, and a pair of rear side containers 5 arranged at the lower left and right of the passenger's seat 4b. Incidentally, in FIG. 1, designated at reference numerals 14 and 15 are driver's and passenger's footsteps, respectively; and 2d is a carburetor disposed between the front and rear cylinder portions 2a, 2b of the engine 2.

In addition to the foregoing, the motor cycle 50 is equipped with the heated air ducting structure 20 shown in FIG. 2. The ducting structure 20 comprises a duct 20a arranged under the driver's seat 4a, between the side covers 8, and directed in the longitudinal direction of the vehicle. The duct 20a has at the front end thereof a heated air entry 20b which, facing the rear face of the rear cylinder portion 2b of the engine 2, conducts heated air into the duct 20a, and at the rear end thereof a heated air exit 20c which, located below the bottom of the passenger's seat 4b, rearwardly opens to vent the heated air, as it is taken in from the entry 20b, in the rearward direction of the vehicle. Moreover, in the duct 20a, an electrically driven vent fan 21 is disposed a little upstream of the exit 20c. Incidentally, the duct 20a is supported by a support member (not shown) to the vehicle body frame 1.

The duct 20a is made of a heat-insulating and heat-resistive material, and arranged such that, in side view, a part thereof underlies the driver's seat 4a. In this concern, the rider's seat 4 has an upwardly recessed portion formed in the bottom part thereof, and a part of the duct 20a is arranged through the recessed portion, so that the duct 20a constitutes no hindrance to the provision of an installation space for accommodating the auxiliary equipment, including the battery. Incidentally, the vent fan 21 is not always a necessary element, and may be omitted in a modification.

As described, in the motor cycle 50, there is provided the heated air ducting structure 20 and, therefore, after the engine 2 is cooled with winds of air from the front air entry 10b of the front cowl 10 or from both sides of the vehicle, the bulk of the resulting heated air is led from the heated air entry 20b into the duct 20a and discharged from the heated air exit 20c, at a position below the bottom of the passenger's seat 4b, in the rearward direction of the vehicle.

Accordingly, even in a narrow space extending around the engine 2 between the engine 2 and a lower surface of the fuel tank 3, the circulation of heated air is favorably effected, thereby preventing the stagnation of heated air in the narrow space, thus avoiding temperature rise therein. Moreover, the present, novel ducting structure is also effective in minimizing the quantity of the heated air that flows along side surfaces of the side covers 8 in the rearward direction of the vehicle. As a result, both a driver and a passenger riding on the motor cycle 50 are substantially kept from being exposed to heated air at their legs and feet resting on the footsteps 14, 15.

In the first embodiment above, the heated air ducting structure 20 has the vent fan 21 disposed in the duct 20a, thus permitting more effective discharge of heated air.

Incidentally, the engine of motor cycles to which the present invention is applicable is not limited to a V type as in the first embodiment, but may well be of an arbitrary type.

Figure 3:
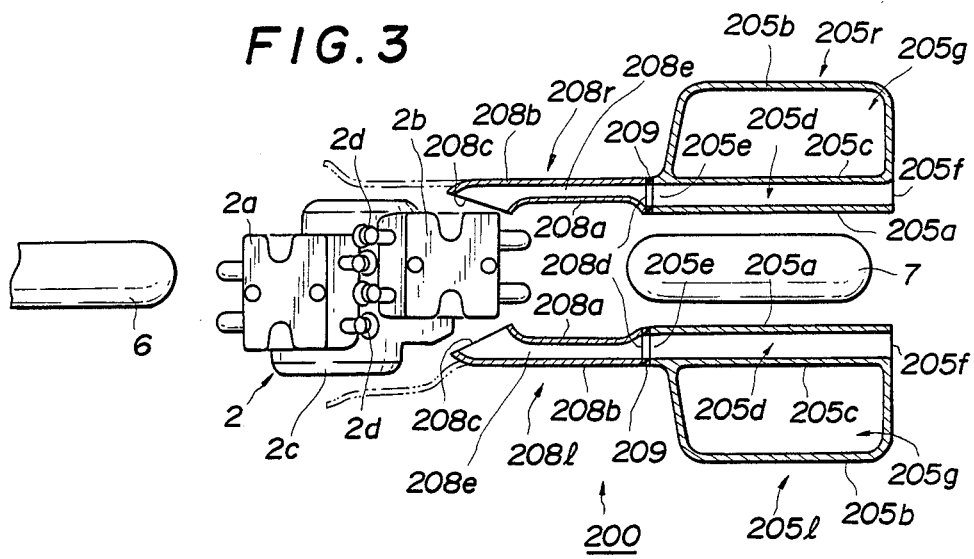
FIG. 3 is a sectional plan view of an essential part of a heated air ducting structure according to a second embodiment of the present invention.

FIG. 3 is a sectional plan view of a heated air ducting structure 200 for motor cycles according to a second embodiment of the present invention.

The heated air ducting structure 200 is equipped in a motor cycle which has a construction similar to that of the motor cycle 50 shown in FIG. 1, other than for the structure 200. For easy comprehension, in relation to the motor cycle 50, like parts are designated by like reference numbers in FIG. 3, and description thereof is omitted.

Also, the appearance of the motor cycle equipped with the heated air ducting structure 200 is substantially the same as that of the motor cycle 50 of FIG. 1.

The heated air ducting structure 200 is constituted by making use of a pair of duct-like side covers 208l, 208r disposed at the lower left and right of a rider's seat (not shown), respectively. The side covers 208l, 208r have an inner space defined therebetween for accommodating therein auxiliary equipment, such as a battery (not shown), and a pair of rear side containers 205l, 205r disposed at the lower left and right of a passenger's seat (not shown), respectively. The rear side containers 205l, 205r are arranged to be continuous to the respective rear parts of the side covers 208l, 208r. The side covers 208l, 208r and the rear side containers 205l, 205r are symmetrical in constitution with each other, respectively, with respect to a vertical plane including the longitudinal centerline of the vehicle. Therefore, for simplicity the associated description below will be made of only the left half of the vehicle, that is, of the side cover 208l and the rear side container 205l installed at the left of the vehicle.

The duct-like side cover 208l comprises an inner wall 208a that faces at the front edge thereof the rear part of a side surface of a rear cylinder portion 2b of an engine 2 and along the inside surface (upper surface in FIG. 3) thereof the auxiliary equipment, and an outer wall 208b that has a front edge portion thereof forwardly extended beyond the front edge of the inner wall 208a and transversely inwardly curved to face the side surface of the rear cylinder portion 2b. The front edge part of the inner wall 208a and that of the outer wall 208b are joined end to end, thereby forming a heated air entry 208c which faces the rear part of the side surface of the rear cylinder portion 2b to take therein such heated air that has come up, flowing by the front and rear cylinder portions 2a, 2b of the engine 2. Along the length of the side cover 208l, the outer wall 208b is transversely outwardly spaced apart by a predetermined distance from the inner wall 208a to have an air passage 208e defined therebetween. At the rear end of the side cover 208l, the rear edge part of the inner wall 208a and that of the outer wall 208b are joined end to end, thereby forming a rear outlet 208d. Like this, the inner and outer walls 208a, 208b are adapted to cooperate with each other to constitute a ducting part.

The rear side container 205l is disposed behind the side cover 208l, alongside a rear wheel 7. The container 205l comprises an inner wall 205a of which the inside surface (upper surface in FIG. 3) faces the rear wheel 7, an intermediate wall 205c that is transversely outwardly spaced apart by a predetermined distance fron the inner wall 205a and adapted to cooperate with the inner wall 205a to have an air passage 205d defined therebetween, and an outer wall 205b that is transversely outwardly spaced apart by a predetermined distance from the intermediate wall 205c and adapted to cooperate with the intermediate wall 205c to provide therebetween an accommodation space 205g of a relatively large volume. The air passage 205d of the container 205l has formed, at the front end thereof, a front inlet 205e communicating through an annular seal member 209 with the rear outlet 208d of the air passage 208e of the side cover 208l and, at the rear end thereof, a heated air exit 205f opening in the rearward direction of the vehicle. Like this, the inner and intermediate walls 205a, 205c are adapted to cooperate with each other to constitute a ducting part. Incidentally, the side cover 208l and the rear side container 208l are both made of a heat-insulating and heat-resisting material.

In the heated air ducting structure 200 according to the second embodiment, the heated air having cooled the engine 2 is taken in at the heated air entries 208c at the front ends of the side covers 208l, 208r, then conducted through the air passages 208e of the side covers 208l, 208r and the air passages 205d of the rear side containers 205l, 205r, and finally discharged from the heated air exits 205f at the rear ends of the containers 205l, 205r in the rearward direction of the vehicle.

Accordingly, also in the heated air ducting structure 200, there can be achieved the same effects as in the heated air ducting structure 20 according to the first embodiment.

Incidentally, as shown by imaginary line in FIG. 3, the respective outer walls 208b of the left and right side covers 208l, 208r may preferably be forwardly extended such that the front edges thereof reach the left and right of the front cylinder portion 2a of the engine 2, to thereby permit the heated air, as it has cooled the engine 2, to be more effectively collected to be discharged in the rearward direction of the vehicle. Moreover, the air passage 208e or 205d may advantageously have an electrically driven vent fan installed therein.

Figure 4:
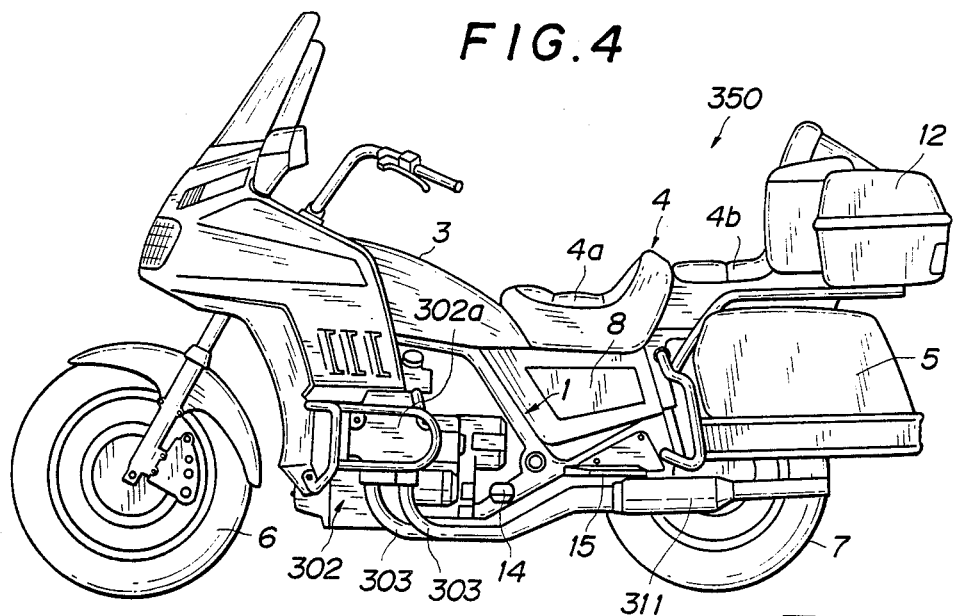
FIG. 4 is a side view of the entirety of a motor cycle equipped with a heated air ducting structure according to a third embodiment of the present invention.
Figure 5:
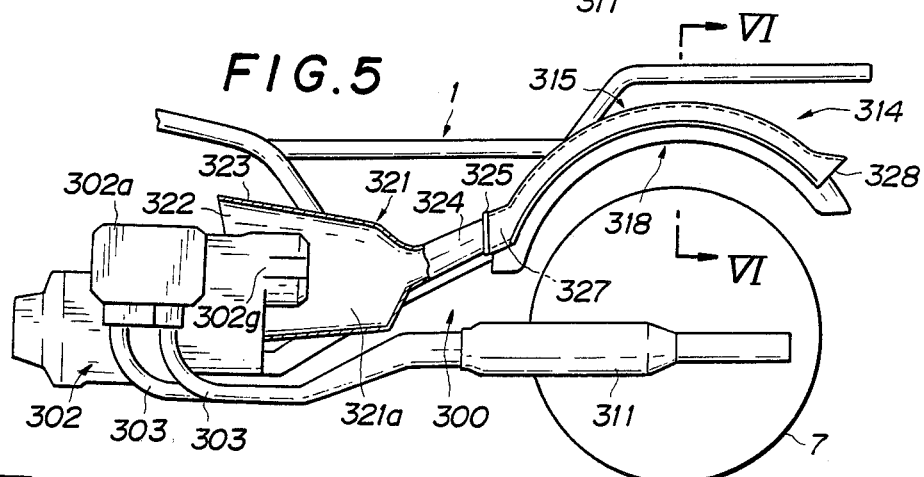
FIG. 5 is a side view, partly in cut, of the heated air ducting structure according to the third embodiment.
Figure 6:
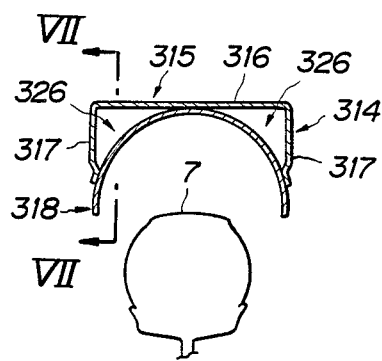
FIG. 6 is a sectional view taken along line VI—VI of FIG. 5.
Figure 7:
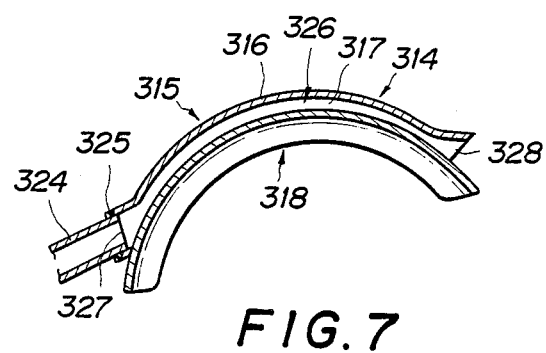
FIG. 7 is a sectional view taken along line VII—VII of FIG. 6.

FIG. 4 is a side view of the entirety of a motor cycle 350 equipped with a heated air ducting structure 300 according to a third equipment of the present invention that is shown in FIGS. 5 to 7. In relation to the motor cycle 50 of FIG. 1, like parts are designated by like reference numbers in FIGS. 4 to 7, and description thereof is omitted.

The motor cycle 350 includes a horizontally opposed four-cylinder engine 302 mounted at a lower position in the front part of a vehicle body frame 1, the engine 302 having cylinders 302a thereof arranged in pairs at the left and right. From the lower parts of the cylinders 302a are led out exhaust pipes 303, 303, respectively, which are rearwardly extended and collected to be connected at each or either side of the vehicle to a muffler 311.

As shown in FIGS. 5 to 7, the heated air ducting structure 300 comprises a funnel-shaped air collecting memeber 321 disposed below a driver's seat 4a, behind the engine 302, the air collecting member 321 having a front large-diameter portion 323 that constitutes a heated air entry 322 and surrounds a generator 302g installed at the rear of the cylinders 302a of the engine 302, and a rear fender 314 having at the front end thereof an air inlet 327 connected to an air outlet that is formed at the rear end of a rear small-diameter portion 324 of the air collecting member 321. As shown in FIG. 5, the large-diameter portion 323 of the member 321 has a radially outwardly bulged configuration.

Incidentally, the air collecting member 321 is made of a heat-insulating and heat-resisting material, and has an air passage 321a formed therein.

The rear fender 314 consists of upper and lower fender members 315, 318 both made of a heat-insulating and heat-resisting material. The lower fender member 318 is of an arcuate configuration, in side view, adapted to cover a rear wheel 7 from thereabove, and the cross section thereof is made in an inverted-U form, as shown in FIG. 6. The upper fender member 315 has, in side view, a substantially arcuate configuration stretched along the upper surface of the lower fender member 318 and, in cross section, an inverted channel form composed of an upper wall 316 and left and right side walls 317, 317, as shown in FIG. 6.

The upper fender member 315 and the lower fender member 318 are joined to each other such that, in cross section, the former 315 abuts, at the central part of the upper wall 316 thereof, on the top part of the latter 318 and continues, at the lower ends of the side walls 317, 317 thereof, to both side surfaces of the latter 318. Thus, between the upper and lower fender members 315, 318 are defined left and right air passages 326, 326, as shown in FIG. 6. The air passages 326, 326 are separated from each other along the length, excepting the upstream ends and downstream ends thereof, where they join each other to communicate with the air inlet 327 at the front end of the rear fender 314 and with the heated air exit 328 at the rear end of the fender 314, respectively.

Moreover, as shown in FIG. 7, the rear small-diameter portion 324 of the air collecting member 321 is connected to the front part of the rear fender 314, by fitting the rear end of the former to the air inlet 327 of the latter, which connection is sealed with an annular seal member 325 fitted on the small-diameter portion 324.

In the heated air ducting structure 300 according to the third embodiment, the air collecting member 321 and the rear fender 314 cooperate with each other to constitute a ducting member. The heated air, as it has cooled the engine 302, is taken in from the heated air entry 322 at the front end of the air collecting member 321, inside the air passage 321a, then conducted through the rear small-diameter portion 324 of the member 321 to the air inlet 327 at the front end of the rear fender 314 and further through the air passages 326, 326 of the fender 314, and finally discharged, from the heated air exit 328 at the rear end of the fender 314, in the rearward direction of the vehicle.

Accordingly, in the heated air ducting structure 300, there can be achieved the same effects as in the heated air ducting structure 20 according to the first embodiment.

Moreover, as described, the air passages 326 are formed in the rear fender 314, thereby contriving effective use of a space which otherwise would uselessly extend over a rear fender, without the need of changing vehicle layout for the provision of such air passage.

Further, the air collecting member 321 is arranged to be located in a space under auxiliary equipment, such as a battery (not shown), installed between both side covers 8, without making an installation space of the auxiliary equipment narrower than usual.

Incidentally, the engine of motor cycles to which the third embodiment is applicable is not limited to a horizontally opposed four-cylinder type, but may well be of an arbitary type.

Figure 8:
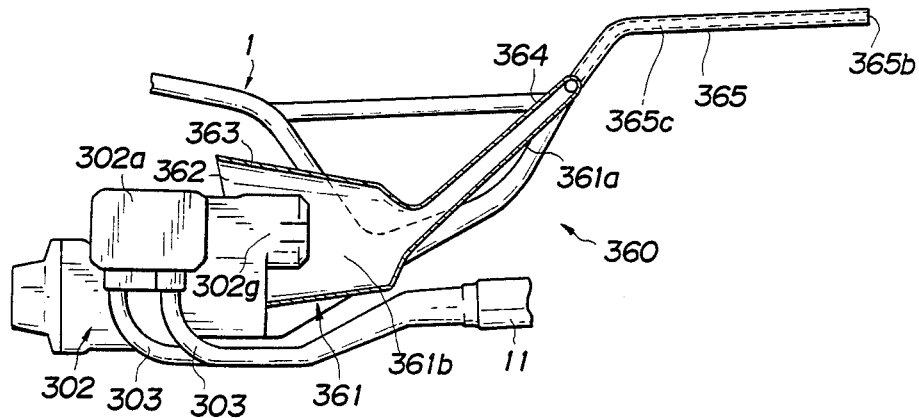
FIG. 8 is a side view, partly in cut, of an essential part of a heated air ducting structure according to a modification of the third embodiment.
Figure 9:
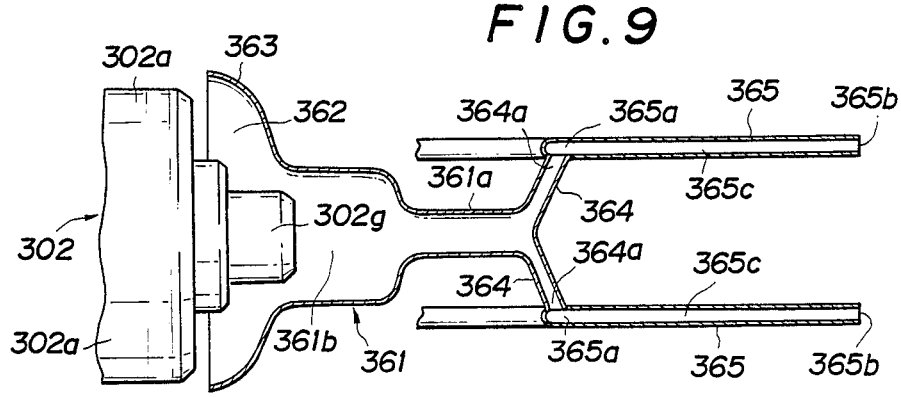
FIG. 9 is a sectional plan view of the heated air ducting structure of FIG. 8.

FIGS. 8 and 9 are a side view, partly in section, and a sectional plan view, respectively, of a heated air ducting structure 360 for motor cycles according to a modification of the third embodiment of the present invention. The heated air ducting structure 360 is equipped in a motor cycle which has a construction similar to that of the motor cycle 350 shown in FIG. 4, other than for the structure 360. For easy comprehension, in relation to the motor cycle 350, like parts are designated by like reference numbers in FIGS. 8, 9, and description thereof is omitted.

The heated air ducting structure 360 comprises a funnel-shaped air collecting memeber 361 disposed below a driver's seat (not shown), behind an engine 302. The air collecting member 361 has a front large-diameter portion 363 that constitutes a front air inlet 362 as a heated air entry and surrounds a generator 302g installed at the rear of cylinders 302a of the engine 302, and left and right pipe frames 365, 365 adapted for supporting a passenger's seat (not shown) and connected to both bifurcations 364, 364 that are formed at the rear end of a rear small-diameter portion 361a of the air collecting member 361. As shown in FIG. 9, the large-diameter portion 363 of the air collecting member 361 is transversely expanded at both sides thereof. Moreover, the air collecting member 361 is made of a heat-insulating and heat-resisting material, and has an air passage 361b formed therein.

The bifurcations 364, 364 at the rear end of the small-diameter portion 361a of the air collecting member 361 are directed so as to transversely outwardly extend therefrom, slightly rearwardly aslant, whereby the air passage 361b in the member 361 is bifurcated at the downstream end thereof to the left and right. Namely, the bifurcations 364, 364 are formed with interior air passages communicating with the air passage 361b of the member 361, respectively. Further, these interior air passages have at the downstream ends thereof air outlets 364a, 364a connected to air inlets 365a, 365a which respective interior air passages 365c, 365c of the left and right pipe frames 365, 365 have at transversely inner sides of the front parts thereof. At the rear ends of the pipe frames 365, 365, heated air exits 365b, 365b of the passages 365c, 365c are opened in the rearward direction of the vehicle.

In the heated air ducting structure 360 according to the present modification, the air collecting member 361 and the seat-supporting pipe frames 365, 365 cooperate with each other to constitute a ducting member. The heated air, as it has cooled the engine 302, is taken in from the large-diameter air inlet 362, as a heated air entry at the front part of the air collecting member 361, inside the air passage 361b and thus into the rear small-diameter portion 361a of the member 361, then conducted through the interior air passages of both bifurcations 364, 364 to the interior air passages 365c, 365c of the left and right pipe frames 365, 365, and finally discharged, from the heated air exits 365b, 365b at the rear ends of the passages 365c, 365c, in the rearward direction of the vehicle.

Accordingly, in the heated air ducting structure 360, there can be achieved the same effects as in the heated air ducting structure 20 according to the first embodiment.

Moreover, in the present modification, the left and right pipe frames 365 as seat pipes are utilized as a part of a heated air ducting structure, thereby contriving effective use of existing members, without the need of using an additional member or changing vehicle layout for the provision of such ducting part.

Further, the air collecting member 361 is disposed under auxiliary equipment, such as a battery (not shown), installed between both side covers (not shown), without making an installation space of the auxiliary equipment narrower than usual.

Incidentally, in the heated air ducting structure 360, the air collecting member 361 is directly connected to the left and right seat pipe frames 365. However, such connection therebetween may be indirectly made by use of other pipe frame portions. Moreover, only one side of the seat frame may be utilized for the provision of air passage. Further, the engine of motor cycles to which the present modification is applicable is not limited to a horizontally opposed four-cylinder type as designated by reference numeral 302, but may well be of an arbitary type.

Figure 10:
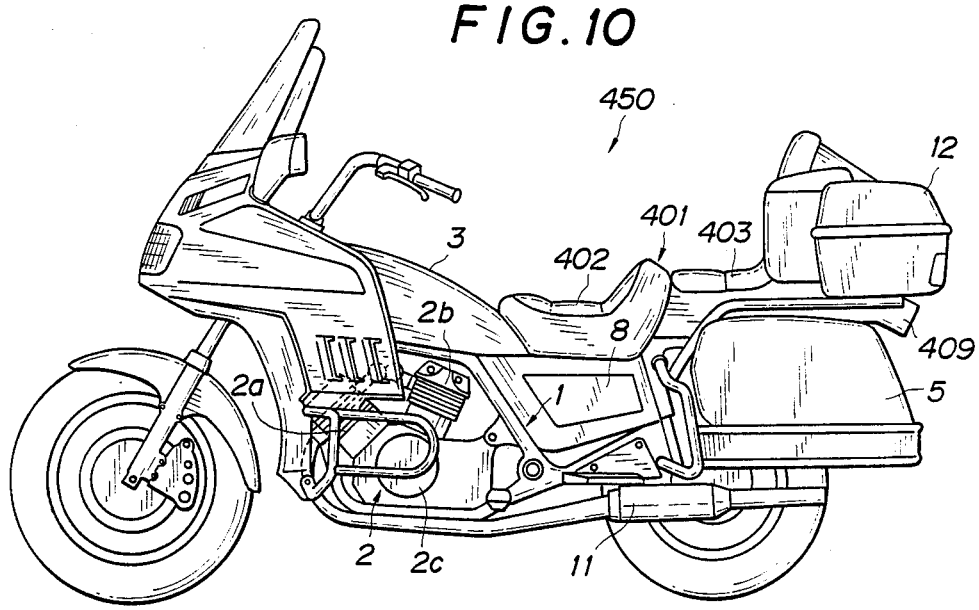
FIG. 10 is a side view of the entirety of a motor cycle equipped with a heated air ducting structure according to a fourth embodiment of the present invention.
Figure 11:
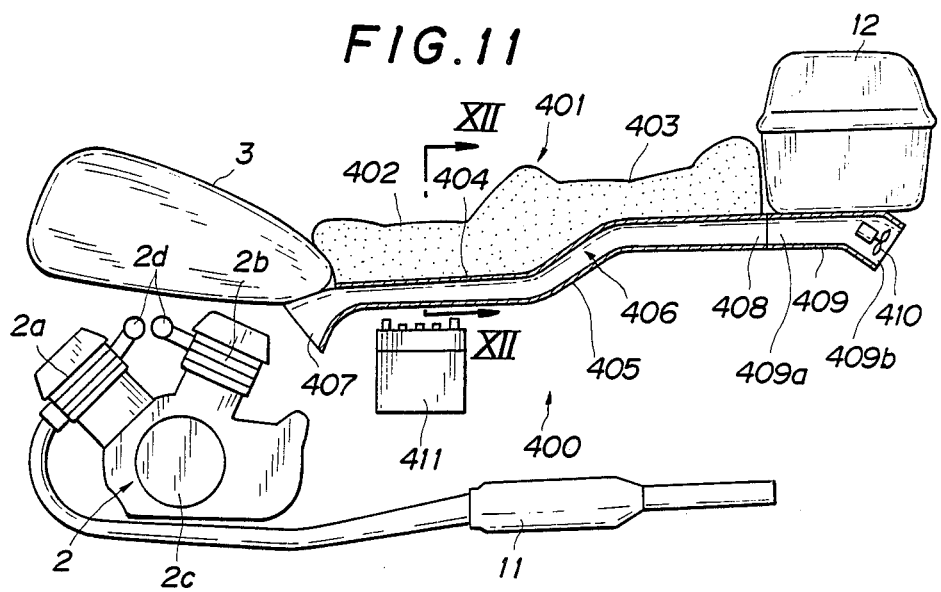
FIG. 11 is a side view, partly in cut, of the heated air ducting structure according to the fourth embodiment.
Figure 12:
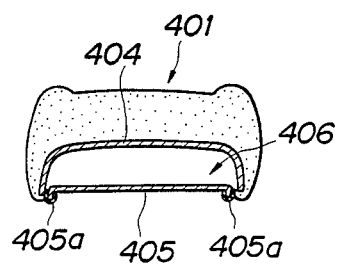
FIG. 12 is a sectional view taken along line XII—XII of FIG. 11.

FIG. 10 is a side view of the entirety of a motor cycle 450 equipped with a heated air ducting structure 400 according to a fourth embodiment of the present invention that is shown in FIGS. 11 and 12. Except for the heated air ducting structure 400, the constitution of the motor cycle 450 is similar to that of the motor cycle 50 shown in FIG. 1. Thus, in relation to the motor cycle 50 of FIG. 1, like parts are designated by like reference numbers in FIGS. 10 to 12, and description thereof is omitted.

The heated air ducting structure 400 is constituted by making use of a bottom plate 404 of a rider's seat 401 which is installed on a vehicle body frame 1, behind a V-type engine 2, and composed of a front part as a driver's seat 402 and a rear part as a passenger's seat 403. The bottom plate 404 of the seat 401 is made of a heat-insulating and heat-resisting material.

As shown in FIGS. 11, 12, the seat bottom plate 404 is of a relatively wide inverted-channel form in cross section and has between the lower edges of both side parts thereof a blocking plate 405 air-tightly fixed thereto through left and right seal members 405a, 405a. The blocking plate 405 extends along the total length of the bottom plate 404 in the longitudinal direction of the vehicle, so that an air passage 406 is defined between the plates 404 and 405 along the total length of the seat 401. The front end part of the blocking plate 405 is frontwardly extended beyond the front end of the driver's seat 402, in a downwardly descending manner, to thereby constitute a heated air inlet 407 facing a rear cylinder portion 2b of the engine 2. The air passage 406 has at the rear end thereof an air outlet 408 connected to an air inlet 409a formed at the front end of an auxiliary duct 409 which is disposed beneath a box-like rear bag 12 installed behind the passenger's seat 403. In the auxiliary duct 409 is installed an electrically driven vent fan 410, which is located a little upstream of a heated air exit 409b provided at the rear end the the duct 409. Incidentally, in FIG. 11, among auxiliary equipment to be covered with both side covers 8, a battery 411 is disposed below the blocking plate 405, under the driver's seat 402.

In the heated air ducting structure 400 according to the fourth embodiment, the seat bottom plate 404, the blocking plate 405, and the auxiliary duct 409 cooperate together to constitute a single ducting member. The bulk of heated air, as it has cooled the engine 2, is taken in from the heated air entry 407 at the front end of the air passage 406, inside this passage 406, then conducted from the air outlet 408 at the rear end of the passage 406 into the air inlet 409a at the front end of the auxiliary duct 409, and finally discharged, from the heated air exit 409b at the rear end of the duct 409, in the rearward direction of the vehicle.

Accordingly, in the heated air ducting structure 400, there can be achieved the same effects as in the heated air ducting structure 20 according to the first embodiment. In this concern, since the ducting member consisting of the elements 404, 405, 409 has the vent fan 410 installed therein, the heated air around the engine 2 is forcibly suctioned, thereby achieving further increased effect in ducting away the heated air from around the engine 2.

Moreover, in the present embodiment, the bulk of the heated air ducting structure 400 is constituted by providing the blocking plate 405 for enclosing to define a ducting space in cooperation with the seat bottom plate 404, thus contriving effective use of an existing member, without the need of changing vehicle layout.

Incidentally, in the heated air ducting structure 400, the vent fan 410 is installed in the auxiliary duct 409. However, such vent fan may be installed in the air passage 406 under the seat 401, to eliminate the auxiliary duct 409 which is not always necessary. In this respect, also, the vent fan 410 itself is not always a necessary element. Further, the engine of motor cycles to which the fourth embodiment is applicable is not limited to a V-type engine as shown in FIGS. 10, 11, but may well be of an arbitary type.

Although there has been described what is at present considered to be the preferred embodiments of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A heated air ducting structure (20; 200; 300; 360; 400) for motor cycles (50; 350; 450) including a vehicle body frame (1), a front wheel (6) and a rear wheel (7) provided at the front and rear of said vehicle body frame, respectively, an engine (2; 302) mounted a lower position substantially in the front part of said vehicle body frame, and a rider's seat (4; 401) installed on said vehicle body frame behind said engine, said heated air ducting structure comprising:
a duct (20a; 208l, 208r, 205a, 205c; 321, 314; 361, 365; 404, 405, 409) having:

a heated air entry (20b; 208c; 322; 362; 407) facing a rear portion (2b; 302g) of said engine (2; 302), and adapted to receive heated cooling air which has passed over said engine (2; 302);
a heated air exit (20c; 205f; 328; 365b; 409b) located at the rear portion of the vehicle and opening in the rearward direction of the vehicle so as to vent the heated air rearwardly of the vehicle; and
an electric vent fan (21) disposed in said duct (20a), upstream of said heated air exit (20c) of said duct (20a).

2. A heated air ducting structure (20) for motor cycles according to claim 1, wherein:
said duct (20a) comprises a ducting member (20a) having said heated air entry (20b) disposed under said rider's seat (4), said heated air entry (20b) facing said rear portion (2b) of said engine (2), and said heated air exit (20c) opening, in the rear of said rider's seat (4), in the rearward direction of the vehicle.

3. A heated air ducting structure (200) for motor cycles (50) including a vehicle body frame (1), a front wheel (6) and a rear wheel (7) provided at the front and rear of said vehicles body frame, respectively, an engine (2) mounted at a lower position substantially in the front part of said vehicle body frame, and a rider's seat (4) installed on said vehicle body frame behind said engine, said heated air ducting structure comprising:
a duct (208l, 208r, 205a, 205c) having:
a heated air entry (208c) facing a rear portion (2b) of said engine (2), and adapted to receive heated cooling air which has passed over said engine (2); and
a heated air exit (205f) located at the rear portion of the vehicle and opening in the rearward direction of the vehicle;
said duct (208l, 208r, 205a, 205c) comprises:
either of duct-like side covers (208, 208r) which are provided at both sides of the vehicle under said rider's seat to cover said auxiliary equipment; and
either of ducting parts (205a, 205c) of rear side containers (205l, 205r) which are provided alongside of said rear wheel (7) so as to be each respectively continuous to the rear part of one of said side covers (208l, 208r) cooperating with said ducting part (205a, 205c) thereof.

4. A heated air ducting structure (200) for motor cycles according to claim 3, wherein:
said duct-like side cover (208l, 208r) is formed with an air passage (208e) having said heated air entry (208c) facing said rear portion (2b) of said engine (2) and a rear opening (208d); and
said ducting part (205a, 205c) of said rear side container (205l, 205r) cooperating with said each of said side covers (208l, 208r) is formed with an air passage (205d) having a front opening (205e) communicating with said rear opening (208d) of said each of said side covers (208l, 208r) and said heated air exit (205f) opening in the rearward direction of the vehicle.

5. A heated air ducting structure (300) for motor cycles (350) including a vehicle body frame (1), a front wheel (6) and a rear wheel (7) provided at the front and rear of said vehicle body frame, respectively, an engine (302) mounted at a lower position substantially in the front part of said vehicle body frame, and a rider's seat (4) installed on said vehicle body frame behind said engine, said heated air ducting structure comprising:
a duct (321, 314) having:

a heated air entry (322) facing a rear portion (302a, 302g) of said engine (302), and adapted to receive heated cooling air which has passed over said engine (302); and a heated air exit (328) located at the rear portion of the vehicle and opening in the rearward direction of the vehicle;

said duct (321, 314) comprises:

an air collecting member (321) disposed on said rider's seat (4), said air collecting member (321) having an air passage (321a) having said heated air entry (322) facing said rear portion (302a, 302g) of said engine (302); and a rear fender (314) disposed above said rear wheel (7) and formed with an air passage (326) having a front opening (327) communicating with a rear opening of said air passage (321a) of said air collecting member (321) and said heated air exit (328) opening in the rearward direction of the vehicle.

6. A heated air ducting structure (300) for motor cycles according to claim 5, wherein:

said rear fender (314) comprises a lower fender member (318) disposed above said rear wheel (7) and an upper fender member (315) joined to the upper surface of said lower fender member (318) and adapted to cooperate with said lower fender member (318) to define said air passage (326) of said rear fender (314).

7. A heated air ducting structure (300) for motor cycles according to claim 6, wherein:

said air passage (326) of said rear fender (326) comprises a pair of passages (326, 326) disposed at the left and right.

8. A heated air ducting structure (300) for motor cycles according to claim 7, wherein:

said lower fender member (318) has, in side view, an arcuate form adapted to cover said rear wheel (7) from above and, in cross section, a substantially inverted-U form;

said upper fender member (315) has, in side view, a substantially arcuate form adapted to extend along the upper surface of said lower fender member (318) and, in cross section, an inverted-channel form consisting of an upper wall (316) and left and right side walls (317, 317); and said upper fender member (315) is joined with said lower fender member (318) such that said upper wall (316) abuts at the central part thereof on the top part of said lower fender member (318) and said side walls (317) are continued at the lower ends thereof to both side surfaces of said lower fender member (318) so that said pair of passages (326, 326) at the left and right are defined between said upper fender member (315) and said lower fender member (318).

9. A heated air ducting structure (360) for motor cycles (350) including a vehicle body frame (1), a front wheel (6) and a rear wheel (7) provided at the front and rear of said vehicle body frame, respectively, an engine (302) mounted at a lower position substantially in the front part of said vehicle body frame, and a rider's seat (4) installed on said vehicle body frame behind said engine, said heated air ducting structure comprising:

a duct (361, 365) having:

a heated air entry (362) facing a rear portion (302a, 302g) of said engine (302), and adapted to receive heated cooling air which passes over said engine (302); and a heated air exit (365b) located at the rear portion of the vehicle and opening in the rearward direction of the vehicle;

said duct (361, 365) comprises:

an air collecting member (361) disposed under said rider's seat, said air collecting member (361) having an air passage (361b) having said heated air entry (362) facing said rear portion (302a, 302g) of said engine (302); and a pipe frame (365) constituting a part of said vehicle body frame, said pipe frame (365) being formed with an air passage (365c) having a front opening (365a) communicating with a rear opening (364a) of said air passage (361b) of said air collecting member (361), and said heated air exit (365b) opening in the rearward direction of the vehicle.

10. A heated air ducting structure (360) for motor cycles according to claim 9, wherein:

said pipe frame (365) comprises a seat frame (365) for supporting said rider's seat.

11. A heated air ducting structure (360) for motor cycles according to claim 10, wherein:

said air collecting member (361) has rear bifurcations (364, 364) for rearwardly bifurcating said air passage (361b) of said air collecting member (361); and said pipe frame (365) comprises left and right portions of said seat frame (365, 365) having therein air passages (365c) respectively having front openings (365a) respectively communicating with rear openings (364a) of said rear bifurcations (364) of said air collecting member (361), and said heated air exits (365b).

12. A heated air ducting structure (400) for motor cycles (450) including a vehicle body frame (1), a front wheel (6) and a rear wheel (7) provided at the front and rear of said vehicle body frame, respectively, an engine (2) mounted at lower position substantially in the front part of said vehicle body frame, and a rider's seat (401) installed on said vehicle body frame behind said engine, said heated air ducting structure comprising:

a duct (404, 405, 409) having:

a heated air entry (407) facing a rear portion (2b) of said engine (2), and adapted to receive heated cooling air which has passed over said engine (2); and a heated air exit (409b) located at the rear portion of the vehicle and opening in the rearward direction of the vehicle;

said duct (404, 405, 409) comprises a bottom plate (404) of said rider's seat (401), and a blocking plate (405) fixed to the lower surface of said seat bottom plate (404) to define therebetween an air passage (406) having at the front end thereof said heated air entry (407) facing said rear portion (2b) of said engine (2), and at the rear end thereof said heated air exit (408, 409b).

13. A heated air ducting structure (400) for motor cycles according to claim 12, further comprising:

an electric vent fan (410) disposed in said air passage (406) upstream of said heated air exit (408, 409b).

* * * * *

UNITED STATES PATENT AND TRADEMARK OFFICE
CERTIFICATE OF CORRECTION

PATENT NO. : 4,735,278

DATED : April 5, 1988

INVENTOR(S) : KOMURO et al.

It is certified that error appears in the above-identified patent and that said Letters Patent is hereby corrected as shown below:

Column 1, line 17, after "arranged" change "in" to --at--;
        line 56, change "minimise" to --minimize--.
Column 2, line 4, change "minimise" to --minimize--;
        line 21, correct the spelling of --features--.
Column 4, line 22, change "tary" to --trary--.
Column 5, line 16, change "fron" to --from--;
        line 60, change "equipment" to --embodiment--.
Column 6, line 8, change "memeber" to --member--.
Column 7, line 16, correct the spelling of --arbitrary--;
        line 29, change "memeber" to --member--.
Column 8, line 34, correct the spelling of --arbitrary--.
Column 9, line 46, correct the spelling of --arbitrary--;
        line 62 (claim 1, line 5), after "mounted" insert --at--.
Column 10, line 24 (claim 3, line 4), change "vehicles" to --vehicle--.

UNITED STATES PATENT AND TRADEMARK OFFICE
CERTIFICATE OF CORRECTION

PATENT NO. : 4,735,278

DATED : April 5, 1988

INVENTOR(S) : Komuro et al.

It is certified that error appears in the above-identified patent and that said Letters Patent is hereby corrected as shown below:

Column 12, line 42 (claim 12, line 5), after "mounted at" insert --a--.

In the Abstract, line 4, after "and" delete "a" (one occurrence).

Signed and Sealed this

Twentieth Day of September, 1988

Attest:

DONALD J. QUIGG

Attesting Officer

Commissioner of Patents and Trademarks